United States Patent [19]

Bosshardt

[11] 3,854,875

[45] Dec. 17, 1974

[54] PLANT FOR TREATING WATER, IN PARTICULAR SEWAGE OR SLUDGE

[75] Inventor: Ernst Bosshardt, Winterthur, Switzerland

[73] Assignee: Sulzer Brothers Ltd., Winterthur, Switzerland

[22] Filed: Oct. 7, 1971

[21] Appl. No.: 187,326

[30] Foreign Application Priority Data
Oct. 7, 1970  Switzerland.................... 14848/70

[52] U.S. Cl................. 21/102 R, 21/54 R, 210/64, 210/152, 250/432
[51] Int. Cl.............................................. A61l 3/00
[58] Field of Search....... 21/2, 54 R, 102 R; 99/217, 99/252; 250/44, 428, 432, 492; 210/1, 2, 64, 152

[56] References Cited
UNITED STATES PATENTS

| | | | |
|---|---|---|---|
| 3,458,140 | 7/1969 | Schryver...................... | 210/152 X |
| 3,535,513 | 10/1970 | Cirami......................... | 21/102 R X |
| 3,603,788 | 9/1971 | Miraldi.................................. | 250/44 |
| 3,630,365 | 12/1971 | Woodbridge et al............... | 210/152 |
| 3,671,741 | 6/1972 | Woodbridge et al................ | 250/44 |

*Primary Examiner*—Barry S. Richman
*Attorney, Agent, or Firm*—Kenyon & Kenyon Reilly Carr & Chapin

[57] ABSTRACT

The water treatment plant is operated on a batch basis with sludge being repeatedly circulated past a source of gamma radiation in order to destroy harmful germs in the sludge batch. After a number of circulations, the batch of sludge is flushed into a collecting vessel for subsequent removal. The sludge batch is passed by the radiation source through a large flow cross-section and at a high flow velocity. The plant achieves a uniform radiation of each batch.

5 Claims, 3 Drawing Figures

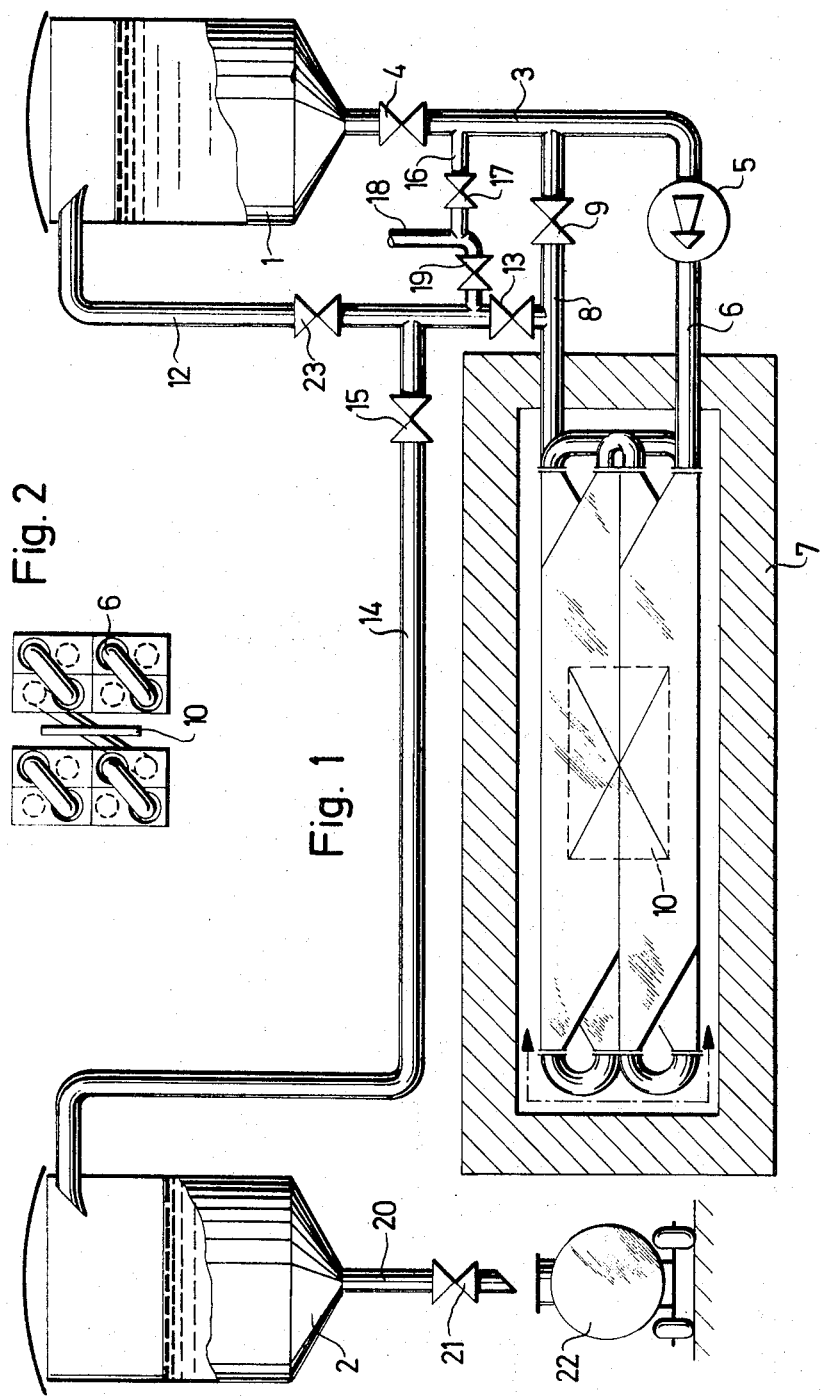

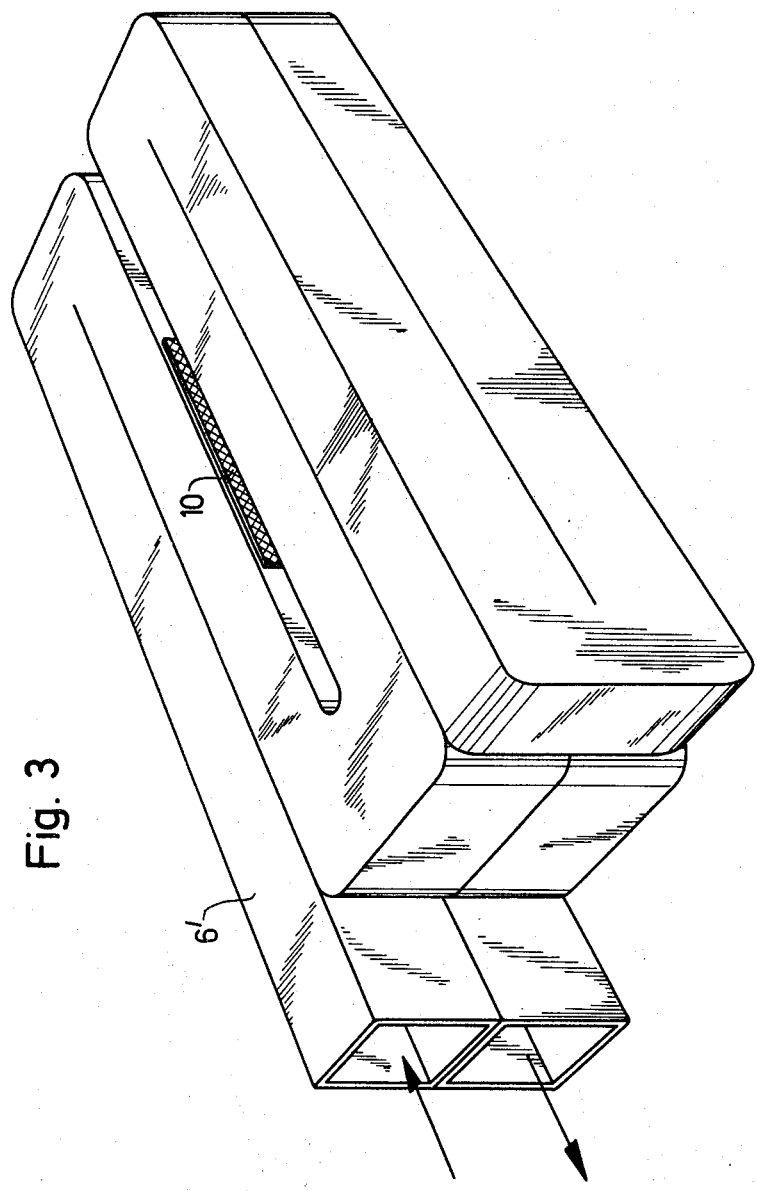

PLANT FOR TREATING WATER, IN PARTICULAR SEWAGE OR SLUDGE

The invention relates to a method for treating water, in particular sewage or sludge, harmful germs being at least partially destroyed by this method.

In a known method for treating sludge of the kind which occurs in clarifying plants the sludge is treated by heat, namely by being passed through a heat exchanger which may be heated, for example by steam. The disadvantage of this method is due to the expensive involved for the heat exchanger on which dirt constantly settles during operation, said dirt being burnt on due to the heat. Removal of the deposited dirt requires a substantial effort in terms of labour. The operating costs are therefore high. The risk of solvent explosions is also a further disadvantage.

The object of the invention is to propose a treatment method which can be performed simply and without risk and which involves only low costs.

The problem is solved according to the invention in that treatment is performed by the action of gamma radiation. The method according to the invention, performed for treating sludge, involves less costs than the previously mentioned known method because the plant costs and operating costs, added together are lower. The method may be performed more simply since it calls for less maintenance work; in particular, there is no need for the removal of dirt deposits which have been burnt on. Apart from simplified operation, operation also becomes more reliable since due to the absence of heating there is no risk of solvent explosions.

According to one embodiment of the method according to the invention, irradiation is performed in batches, for example by filling the liquid to be irradiated into portable vessels which are then exposed to the radiation source. The rate distribution therefore becomes more uniform, that is to say, all batches which are to be irradiated will absorb the same energy.

According to another embodiment of the invention the liquid to be irradiated flows past at least one radiation source. This embodiment is characterized by a high degree of simlicity since it dispenses with the need for filling into portable vessels. In a particularly advantageous embodiment of the method according to the invention the liquid to be irradiated is repeatedly circulated past at least one radiation source. This method permits the use of a large flow cross-section and a high flow velocity. The large flow cross-section leads to a material-saving construction of the plant so that only little radiation is absorbed by the material which defines the flow cross-section. The high flow velocity prevents settling of substances suspended in the liquid which is to be irradiated.

The invention also relates to a plant for performing the method according to the invention and is characterized in that it contains a source which emits gamma radiation and is surrounded on at least two sides by a duct which carries the liquid to be treated.

One embodiment of the invention is explained hereinbelow by reference to the accompanying drawing in which:

FIG. 1 is a diagrammatic view of a plant according to the invention for the irradiation of sludge, FIG. 2 is a side view of the sludge-carrying duct system according to FIG. 1 in the zone of the radiation source, and FIG. 3 is a perspective view of another embodiment of the duct system in the zone of the radiation source.

According to FIG. 1 the plant comprises a collecting vessel 1 for storing a supply of untreated sludge and a collecting vessel 2 for treated sludge. A duct 3, provided with a stop valve 4 and extending to the suction side of a pump 5, is connected to the lower end of the collecting vessel. The delivery side of the pump 5 adjoins a duct system or means 6 which is repeatedly guided to and fro within a chamber 7 of concrete, functioning as radiation shield, the outlet of said duct being connected through a duct 8 with stop valve 9 to the duct 3 between the valve 4 and the inlet of the pump 5. A closed loop is thus formed within which a batch of sludge to be irradiated may be circulated by means of the pump 5. As disclosed by referece to FIG. 2, a radiation source 10 is disposed between two sections of the duct system 6, said radiation source emitting gamma rays and comprising, for example, cobalt 60. These sections of the duct system 6 define an unencumbered flow path for the sludge, i.e., a path free of baffles.

Each circulated sludge particle receives practically the same radiation dose owing to the fact that the duct system 6 surrounds the radiation source 10 on both sides and extends over two decks.

A duct 12, having two stop valves 13 and 23 and extending upwardly into the collecting vessel 1 branches off from the duct system 6 in the flow direction of the sludge and upstream of the valve 9. A duct 14, having a stop valve 15 and extending upwardly into the collecting vessel 2 for irradiated material branches off from the duct 12 in the flow direction of the sludge and upstream of the stop valve 23. In the practical embodiment of the plant the stop valve 15 is disposed as close as possible to the duct 12 so that the dead space upstream of the valve 15 is as small as possible.

The plant is provided with a water supply system having two water pipe connections for flushing purposes. One water supply line 16 with a stop valve 17 extends into the duct 3 at a position which is as close as possible to the end of the duct 8 while the other supply line 18 with stop valve 19 extends downstream of the stop valve 13 and as close as possible thereto into the duct 12.

The plant described hereinabove functions as follows:

The stop valves 4, 13 and 23 are opened to fill the duct system 6 with sludge which is to be irradiated, the valves 9, 15, 17 and 19 being closed. The sludge is then delivered from the vessel into the duct system 6 by means of the pump 5, the said duct system being filled when the sludge returns from the duct 12 into the vessel 1. The valve 4 is then closed and the valve 9 opened. The sludge located in the duct system 6 will then be recirculated by means of the pump 5 and exposed to the radiation source 10 until such time when all such particles are free of germs, the said time being determined on the basis of experience. Any air enclosed or introduced when the duct system is filled escapes over the duct 12. After irradiation is completed that duct 12 is flushed by closing of the valve 13 and opening of the valve 19 so that water can flow through the duct 18 into the duct 12. The duct system 6 may then be emptied of irradiated sludge. To this end the stop valves 9, 23 and 19 are closed and the stop valve 17 of the water supply line 16 as well as the stop valve 15 in the duct 14 and the stop valve 13 are opened. The pump 5 will then draw water from the duct 16 and deliver the irradiated sludge in the duct system 6 through the stop valves 13 and 15 and the duct 14 into the collecting vessel 2. After the stop valves 17 and 15 are closed and the stop valves 4 and 23 are opened, sludge may once again flow from the vessel 1 into the duct system 6 for irradiation whereupon the operating cycle described hereinabove is repeated.

To dispose of irradiated sludge it is possible for trucks to be disposed below the collecting vessel 2, the irradiated sludge being discharged from the vessel 2 through a discharge duct 20 and stop valve 21 into the said truck. In addition to being used for discharging the duct system 6 or to flush the duct 12, the water line connections 16 and 18 may also be used for flushing the duct system 6, an operation which may be performed, for example once every week.

In the embodiment illustrated in FIG. 3 the duct system 6' is constructed so that the material to be irradiated is first delivered twice past the radiation source 10 in an upper deck and for each circulation and is then once again delivered in a lower deck twice on both sides of the radiation source whereupon it leaves the duct system below the inlet thereof.

The dose range for this application may amount to between 1 krad to 100 Mrad.

I claim:

1. A sewage sludge treatment plant comprising
a source of gamma radiation;
duct means disposed about said source of gamma radiation to provide a closed loop for the sludge, said duct means having at least two sections exposed to different sides of said source and defining an unencumbered flow path for the sludge;
means for forming a batch of sludge from a supply of sludge to be irradiated, said means being connected to said duct means to deliver said batch of sludge to said duct means; and
a pump connected within and to said duct means for repeatedly circulating a delivered batch of sludge through said closed loop of said duct means from a delivery side of said pump through said unencumbered path in said sections of said duct means to an input side of said pump.

2. A water treatment plant as set forth in claim 1 wherein said means for forming a batch of sludge includes a collecting vessel for containing the supply of sludge to be irradiated, a first duct connecting said collecting vessel to said duct means to deliver sludge to said duct means and a second duct to return sludge from said duct means to said collecting vessel.

3. A water treatment plant as set forth in claim 1 further comprising a water supply means selectively connected to said duct means for flushing water through said duct means.

4. A water treatment plant as set forth in claim 1 further comprising a collecting vessel selectively connected to said duct means to receive an irradiated batch of sludge therefrom.

5. A water treatment plant as set forth in claim 4 further comprising valve means between said duct means and said collecting vessel for controlling passage of an irradiated batch of sludge from said duct means to said collecting vessel.

* * * * *